Sept. 15, 1959 L. J. MOELLER 2,903,738
APPARATUS FOR STRIPPING MOLDS
Filed Nov. 22, 1957 5 Sheets-Sheet 1

INVENTOR.
L. J. MOELLER
BY A. C. Schwarz, Jr.
ATTORNEY

Sept. 15, 1959

L. J. MOELLER 2,903,738

APPARATUS FOR STRIPPING MOLDS

Filed Nov. 22, 1957

INVENTOR.
L. J. MOELLER
BY
A. C. Schwarz, Jr.
ATTORNEY

Sept. 15, 1959

L. J. MOELLER 2,903,738

APPARATUS FOR STRIPPING MOLDS

Filed Nov. 22, 1957

INVENTOR.
L. J. MOELLER
BY
A. C. Schwarz, Jr.
ATTORNEY

Sept. 15, 1959 L. J. MOELLER 2,903,738
APPARATUS FOR STRIPPING MOLDS
Filed Nov. 22, 1957 5 Sheets-Sheet 4

INVENTOR.
L. J. MOELLER
BY A. C. Schwarz, Jr.
ATTORNEY

Sept. 15, 1959    L. J. MOELLER    2,903,738
APPARATUS FOR STRIPPING MOLDS
Filed Nov. 22, 1957    5 Sheets-Sheet 5

INVENTOR.
L. J. MOELLER
BY a. C. Schwarz, Jr.
ATTORNEY

United States Patent Office 2,903,738
Patented Sept. 15, 1959

2,903,738

APPARATUS FOR STRIPPING MOLDS

Lowell J. Moeller, Indianapolis, Ind., assignor to Western Electric Company, Incorporated, New York, N.Y., a corporation of New York Application November 22, 1957, Serial No. 698,093

5 Claims. (Cl. 18—2)

This invention relates to apparatus for stripping molds, and more particularly, although not exclusively, to stripping apparatus for separating a plurality of portions of molds and removing molded products therefrom.

In the manufacture of certain cast resin terminal strips which are utilized in the communications industry, a plurality of rows of spaced terminals are embedded partially in a flat rectangular block of cast resin with the ends of the terminals projecting from opposing sides thereof. The cast resin block is molded about the terminals which are positioned in a composite mold made up of two complementary interlocking mold halves. After the cast resin has become hardened by curing, it is necessary to separate the mold halves from the finished cast resin terminal strip without damaging the terminal strip.

An object of the invention is to provide improved apparatus for stripping molded articles of manufacture by separating sections of the mold from each other and for supporting the article during its removal from the sections of the mold.

A more specific object of the present invention is to provide apparatus for stripping articles of manufacture from component parts of molds and supporting the articles of manufacture during the stripping operation.

A still further object of the present invention is to provide apparatus for stripping articles of manufacture from molds, which are durable, simple in construction, and efficient in operation.

To accomplish the above and other objects of the invention a mold stripping apparatus may include backing plates engaging the ends of terminals extending from the molded article through apertures in separable mold sections, means for separating the mold sections, and furcated support means reciprocable into position between the mold sections for supporting the molded article during and after its removal from the mold.

Other objects and features of the invention will be more readily understood from the following detailed description of a specific embodiment thereof when read in conjunction with the accompanying drawings, in which:

Fig. 4 is a fragmentary, sectional view of the apparatus of Fig. 1 taken along line 4—4 thereof;

Figure 6:
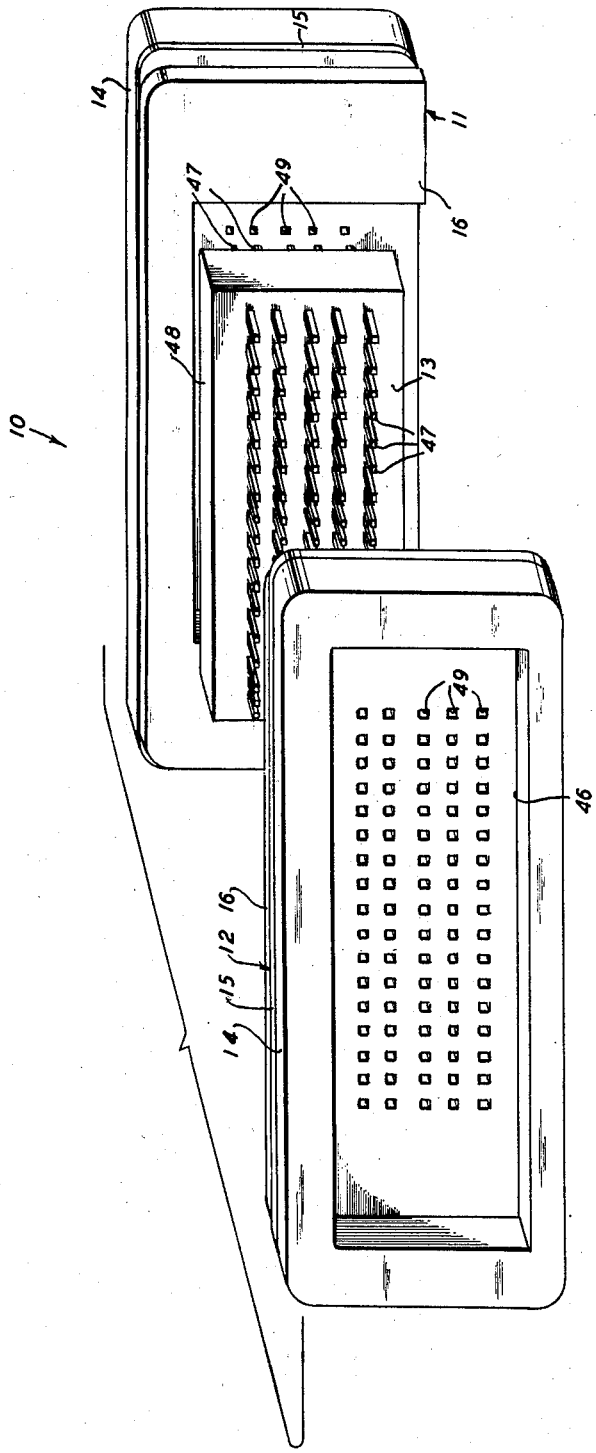
Fig. 6 is an exploded view of a segmental mold and molded article.

Referring now to the drawings wherein the same numeral designates like or similar elements throughout the several views, a mold, designated generally by the numeral 10, consisting of two halves, designated generally by the numerals 11 and 12 is illustrated with a finished cast resin terminal strip 13, Fig. 6, similar to those disclosed in Patent No. 2,711,818, granted to P. Ruttkay on June 28, 1955. The mold halves 11 and 12 are illustrated in Fig. 4 in their most contiguous locked position prior to the stripping operation. The stripping operation separates the mold halves 11 and 12 to release the finished cast resin terminal strip 13. The mold halves 11 and 12 each consists of an annular member 14, a flat plate 15 and a substantially inverted U-shaped member 16. The U-shaped members 16—16 may be secured to the associated plates 15—15, or may be one piece positioned between or secured to one of the two separable mold sections 11 and 12.

The mold stripping apparatus includes two sets of slidably movable jaws 17—17 and 18—18 having projecting portions 19—19 which are designed to engage projecting portions 21—21 of the mold halves 11 and 12 containing the finished terminal strip 13. The jaws 17—17 and 18—18 have vertically extending dovetailed tongues 22—22 which are secured in vertically extending dovetailed grooves 23—23 in horizontally slidable members 24—24. The horizontally slidable members 24—24 have dovetailed projections 26—26 for mounting the members 24—24 in corresponding dovetailed slideways 27—27 in members 28—28 secured rigidly to a base plate 29 by appropriate means 31 (see Fig. 2).

Figure 3:
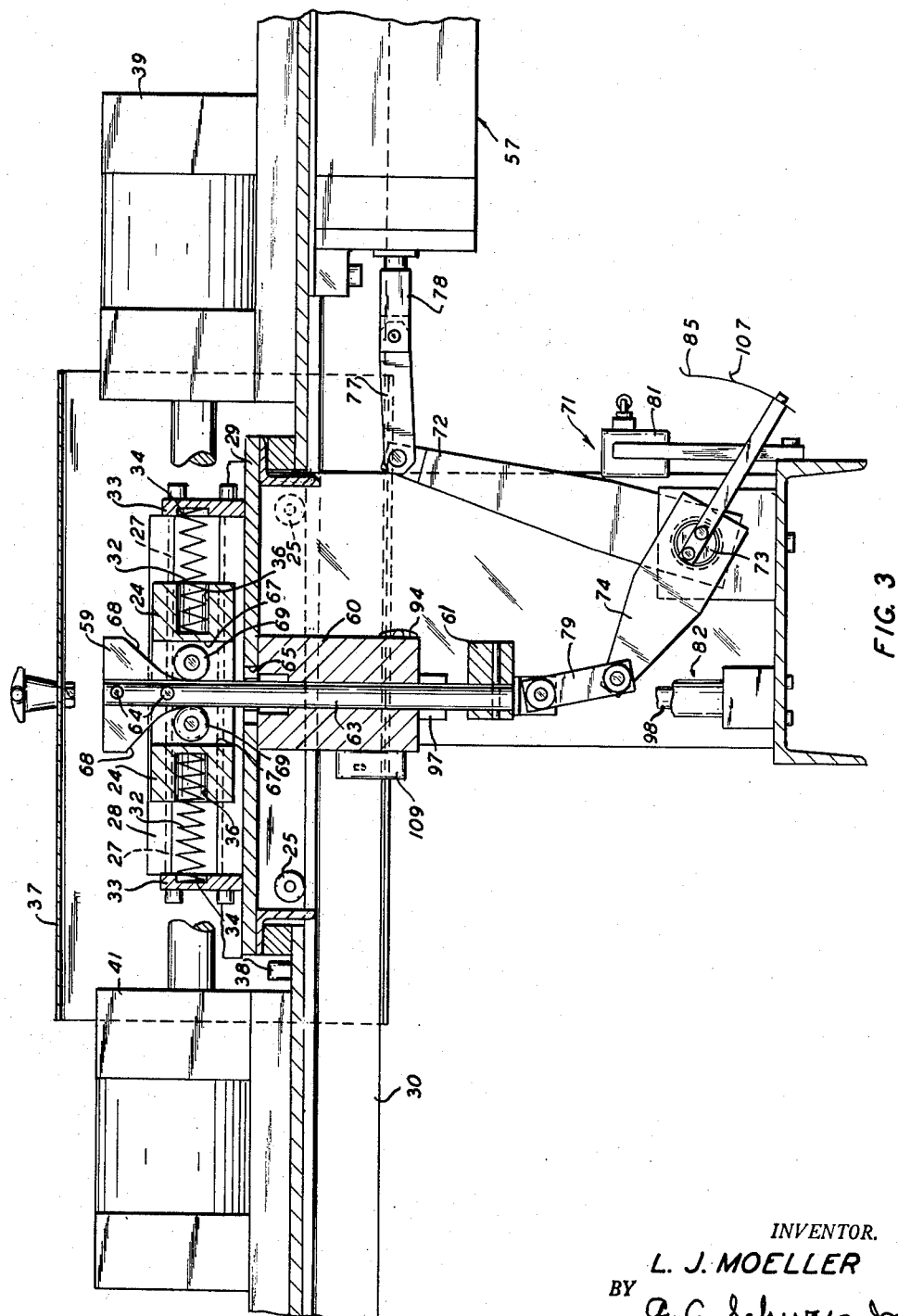
Fig. 3 is a fragmentary, sectional view of the apparatus of Fig. 1 taken along line 3—3 of Fig. 2.

Compression springs 32—32 (see Figs. 1 and 3) are utilized to urge the jaws 17—17 and 18—18 toward each other and are positioned between the opposing sides of the jaws 17—17 and 18—18 and stop members 33—33 secured rigidly to the members 28—28 adjacent to the opposing ends of the slideways 27—27. One end of each of the springs 32—32 is positioned in a bore 34 in the associated stop members 33 and the opposing end of each of the springs 32—32 is positioned in a bore 36 in the associated slidable member 24 (see Fig. 3).

The mold 10 with the finished cast resin terminal strip 13 therein, is positioned in the mold stripping apparatus on the base plate 29 with the movable jaws 17—17 and 18—18 positioned between the mold halves 11 and 12. A horizontally, reciprocable guard hood 37 is supported slidably on rollers 25—25 by angle irons 30—30 to cover up or expose the working parts of the apparatus above the base plate 29. The closure of the hood 37 closes a switch 38 which results in the energization of a solenoid-operated valve (not shown) to direct fluid to piston-cylinder assemblies 39 and 41, associated with backing plates 42 and 43, respectively, to actuate the piston-cylinder assemblies 39 and 41. The actuation of the piston-cylinder assemblies 39 and 41 reciprocate the backing plates 42 and 43 into associated depressions 44 and 46 in the opposing sides of the mold halves 11 and 12, respectively (see Fig. 4), and into contact with a plurality of rows of spaced terminals 47—47.

The terminals 47—47 are embedded partially into a flat, rectangular block 48 of cast resin and project through apertures 49—49 in the mold halves 11 and 12. The ends of the rows of terminals 47—47 may terminate in the same plane thus resulting in the necessity of providing a flat surface 51 on each of the backing plates 42 and 43. However, the ends of the terminals 47—47 on some of the terminal strips 13 may project further than other terminals 47—47 resulting in the necessity of providing the surface 51 of each of the backing plates 42 and 43 with an irregular contour.

Figure 1:
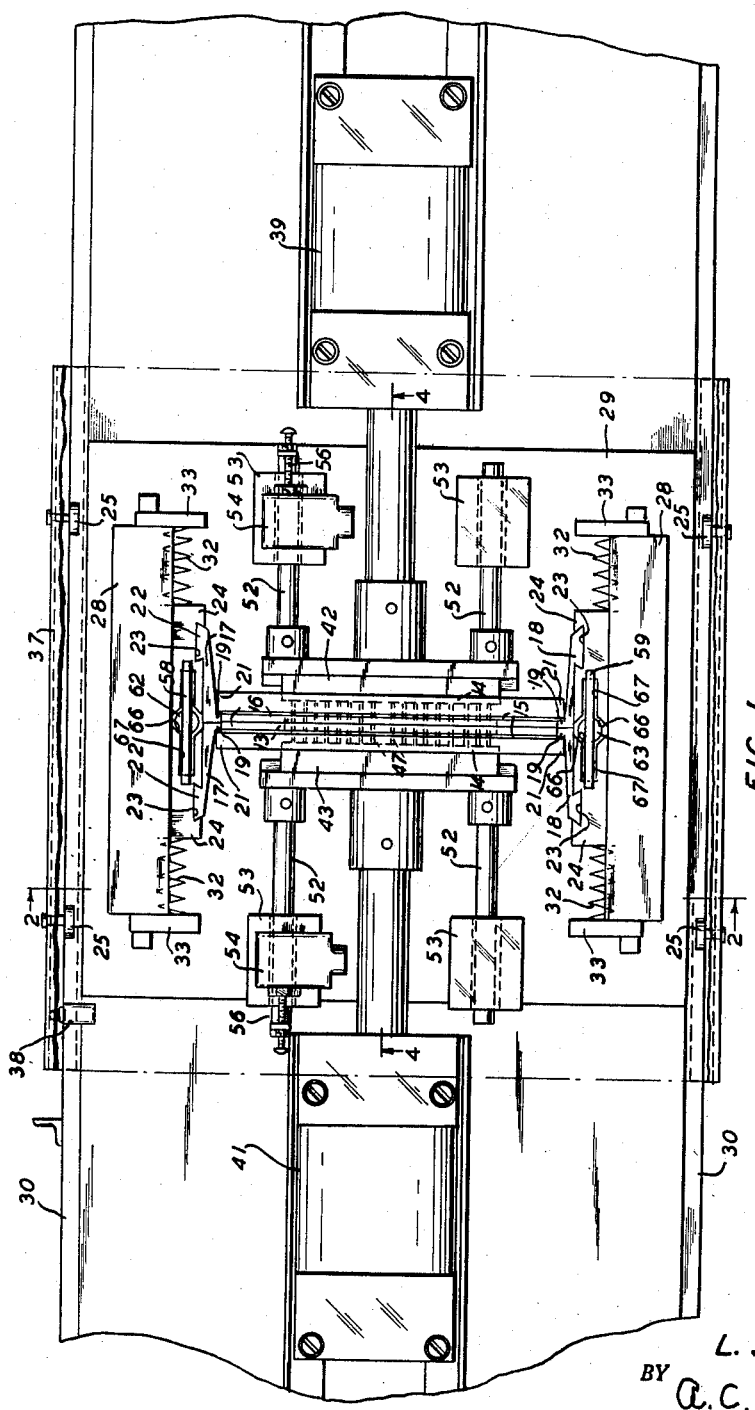
Fig. 1 is a fragmentary, top plan view of a specific embodiment of a mold stripping apparatus illustrating certain features of the invention.
Figure 5:
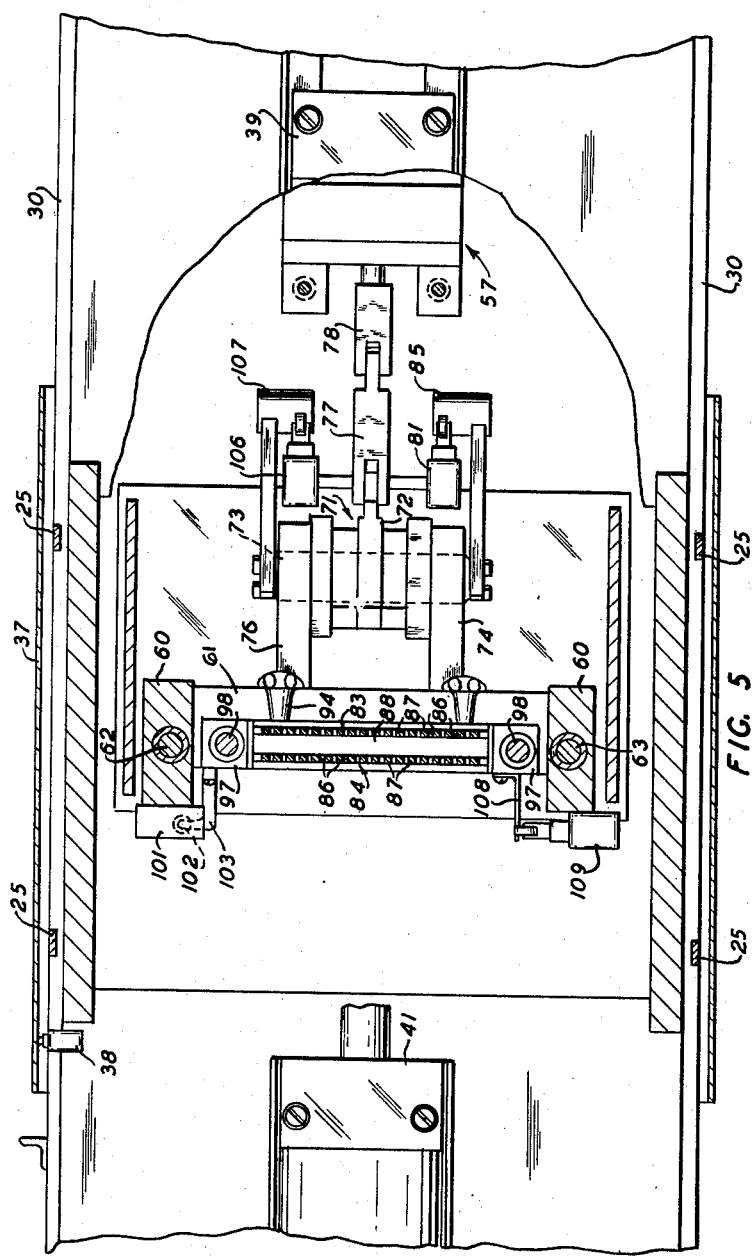
Fig. 5 is a fragmentary, sectional view of the apparatus of Fig. 1 taken along line 5—5 of Fig. 2.

The backing plates 42 and 43 are supported and guided partially by rods 52—52, Figs. 1 and 4, which reciprocate in bearing blocks 53—53. Switches 54—54 are secured to the bearing blocks 53—53 and provided to be actuated by feeler members or actuators 56—56, secured adjustably to the free ends of the rods 52—52, at the end of inward travel of the backing plates 42 and 43. The actuation of the switches 54—54, in turn, results in the energization of a solenoid-operated valve (not shown) to direct fluid to a fluid actuated piston-cylinder assembly, designated generally by the numeral 57, Figs. 3 and 5, to actuate generally triangular-shaped reciprocal cam members 58 and 59.

The cam members 58 and 59 are attached to a yoke 61 by rod members 62 and 63, respectively, the latter of which are guided by bearing blocks 60—60. The cam members 58 and 59 are secured between bifurcations, in the ends of the rod members 62 and 63, by appropriate means 64, Fig. 3. Each of the rods 62 and 63 are positioned reciprocably between the slidable members 24—24 in V-shaped slots 66 therein. The cam members 58 and 59 are reciprocated vertically by the rods 62 and 63, respectively, in apertures 65—65 in the base plate 29 and in slots 67—67 in the horizontally slidable members 24—24. The camming surfaces 68—68 of the cam members 58 and 59 bear against rotating cam followers 69—69 secured in elongated slots 67—67 in the members 24—24, Fig. 3.

The yoke 61, in turn, is reciprocated vertically by means of a bell crank assembly, designated generally by the numeral 71, formed of a lever 72, keyed to a shaft 73, and two levers 74 and 76, keyed to the opposing ends of the shaft 73. The bell crank assembly 71 is actuated by the piston-cylinder assembly 57 through a linkage 77 connected to the piston rod 78 and linkages 79—79, secured to opposing sides of the yoke 61, to cause the cam members 58 and 59 to be pulled down between the jaws 17—17 and 18—18, respectively, to move the mold halves 11 and 12 apart while maintaining the faces thereof in parallel, spaced relationship.

A switch 81 is provided to actuate a solenoid-actuated valve associated with a fluid supply to a piston-cylinder assembly, designated generally by the numeral 82, when the cam members 58 and 59 have caused the die halves 11 and 12 to reach a predetermined position so that the ends of the terminals are flush with the inside surface of the depressions 44 and 46 formed by the outside surface of the plate 15—15. The switch 81 is actuated by an arcuate-shaped member 85 secured rigidly to the shaft 73.

The actuation of the piston-cylinder assembly 82 causes vertically, reciprocable combs, designated generally by the numerals 83 and 84 to move upwardly to support and cradle the terminal strip 13 during the remainder of the stripping operation, and during and after the strip 13 is released from the mold halves 11 and 12.

The individual vertical rows of terminals 47—47 on the terminal strip 13 are received within vertical slots 86—86 in the combs 83 and 84 forming the teeth 87—87 of the combs, so that the terminal strip 13 is cradled thereby and prevented from dropping when the mold halves 11 and 12 have been stripped completely therefrom.

The combs 83 and 84 are secured rigidly to a block member 88 which, in turn, is secured removably to a yoke member 89 by rod portions 91—91 projecting from the block member 88 into corresponding apertures 92—92. The rod projections 91—91 each have a transverse, arcuate-shaped slot 93 in the side thereof designed for reception of a bolt member 94 for locking the projections 91—91 in place in the yoke member 89. The yoke member 89 is secured to a threaded end of the piston rod 96 and is guided by bearing blocks 97—97 secured slidably to rods 98—98.

Figure 2:
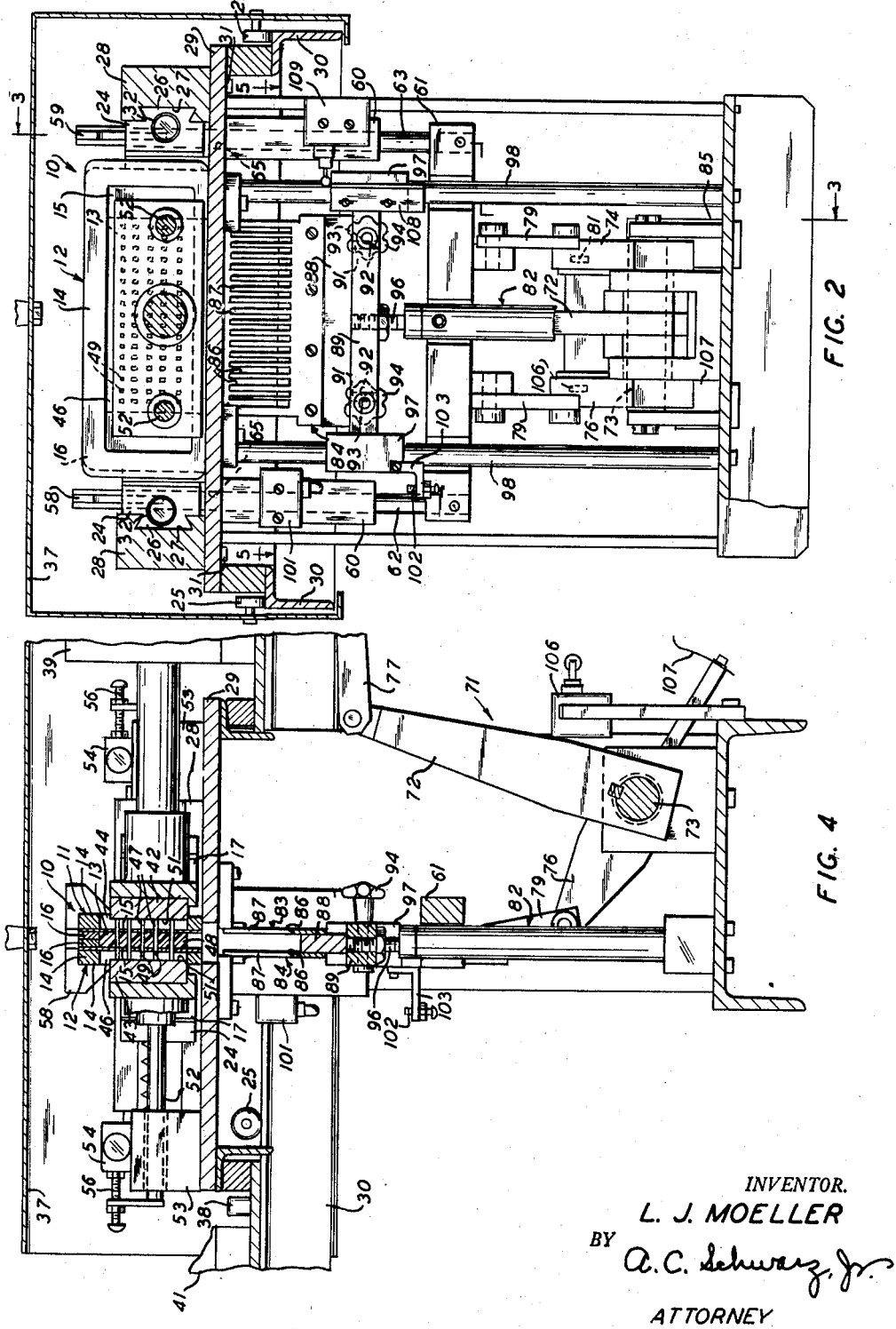
Fig. 2 is a fragmentary, sectional view of the apparatus of Fig. 1 taken along line 2—2 thereof.

A switch 101, Fig. 2, is provided to be actuated by an adjustable screw 102 in an L-shaped member 103 secured rigidly to the bearing block 97 when the combs 83 and 84 reach the end of their upward stroke. The actuation of the switch 101 results in the energization of the solenoid-actuated valve associated with the supply of fluid to the assemblies 39 and 41 to shut off the supply of fluid to the piston-cylinder assemblies 39 and 41 associated with the backing plates 42 and 43, respectively. The piston-cylinder assemblies 39 and 41 associated with the backing plates 42 and 43, respectively, are of the spring-return type and thus move the backing plates 42 and 43 out of the path of travel of the die halves 11 and 12. The movement of the backing plates 42 and 43 allows the cams 58 and 59 to complete their downward strokes to move the die halves 11 and 12 apart far enough to release the terminal strip 13 therefrom.

A switch 106 is provided to be actuated by an arcuate-shaped member 107 secured rigidly to the shaft 73. When the cams 58 and 59 are reciprocated to a predetermined position to actuate the switch 106, a solenoid-operated valve (not shown) is energized to reverse the the supply of fluid to the piston-cylinder assembly 82. The reversal of the piston in the assembly 82 causes the combs 83 and 84 and finished cast resin terminal strip 13 to be lowered. The movement of the combs 83 and 84 to a downward position causes an L-shaped plate member 108 secured to the block 97 to actuate a switch 109. The actuation of the switch 109 results in the opening of the valve associated with the assembly 57 to reverse the flow of fluid to the piston-cylinder assembly 57 to cause the cams 58 and 59 to reciprocate to their uppermost position. The movement of the cams 58 and 59 to the initial start position results in the actuation of a latch associated with the guard hood 37 which permits the operator to remove the finished cast resin terminal strip 13 and the mold sections 11 and 12 from the mold stripping apparatus and prepare the apparatus for a subsequent stripping operation.

Operation

The operator places the mold 10 with separable sections 11 and 12 in place on the base 29 with the completed terminal strip 13 therebetween. The operator then moves the guard hood 37 in place over the exposed, moving parts of the stripping apparatus. The movement of the guard hood 37 to a closed position actuates the switch 38 which results in the energization of the solenoid-operated valve between a fluid supply and the piston-cylinder assemblies 39 and 41, associated with the backing plates 42 and 43. The fluid is directed to the assemblies 39 and 41 to move the faces 51—51 of the backing plates 42 and 43 against the associated, opposing ends of the terminals 47—47. After a predetermined travel of the backing plates 42 and 43, the switches 54—54 are actuated by the adjustable actuators 56—56 secured to the ends of the rods 52—52.

The actuation of the switches 54—54 results in the energization of the solenoid-operated valve to apply fluid pressure to the piston-cylinder assembly 57 associated with the cam members 58 and 59. The assembly 57, through the associated linkages 77 and 79 and the assembly 71, pulls the cam members 58 and 59 downwardly until the inside surfaces forming the concavities 44 and 46, on the opposing sides of the mold halves 11 and 12, respectively, engage the surfaces 51—51 of the backing plates 42 and 43. When the mold halves 11 and 12 are pushed against the backing plates 42 and 43, the assemblies 39 and 41, associated with the backing plates 42 and 43, prevent the cam members 58 and 59 from being able to force the mold halves 11 and 12 further apart at this time. The switch 81 is then actuated to energize the solenoid-actuated valve associated with the fluid supply to the piston-cylinder assembly 82, associated with the comb members 83 and 84.

The actuation of the piston-cylinder assembly 82 results in the reciprocation of the comb members 83 and 84 to a position wherein the rows of terminals 47—47 are nested between the furcations forming the teeth 87—87 of the comb members 83 and 84 to nest the terminal strip 13 between the combs 83 and 84. When the comb members 83 and 84 are moved upwardly a predetermined distance the switch 109 is actuated which, when reactuated, subsequently by the downward movement of the comb members 83 and 84, will result in the actuation of the solenoid-operated valve associated with the piston-cylinder assembly 57 and the solenoid associated with the latch which permits movement of the guard hood 37.

When the combs 83 and 84 have reached the end of their upward stroke the switch 101 is actuated which results in the de-energization of the solenoid-operated valve to shut off the fluid supply to the piston-cylinder assemblies 39 and 41 which permits the spring-return piston to move the backing plates 42 and 43 out of contact with the ends of the terminals 47—47 to allow the cam members 58 and 59 to complete their downward stroke. The movement of the cam members 58 and 59 downwardly results in the movement of the die halves 11 and 12 in opposite directions, away from each other, to free the terminal strip 13 from the die halves 11 and 12 and removes the terminals 47—47 from the apertures 49—49 therein.

When the cam members 58 and 59 reach the end of the downward stroke, the switch 106 is actuated which results in the energization of the solenoid-operated valve to discontinue the supply of fluid pressure on one side of the piston of the piston-cylinder assembly 82 and to apply fluid pressure to the opposing side of the piston to move the comb members 83 and 84 in a downward direction. When the comb members 83 and 84 reach the bottom of the stroke, the switch 109 is actuated which, in turn, results in de-energization of the solenoid-operated valve which removes the fluid pressure from one side of the piston in the assembly 57 and directs fluid to the opposite side of the piston resulting in the return of the cam members 58 and 59 to the upward and starting position.

The actuation of the switch 109 also resulted in the de-energization of the latch solenoid to allow the hood 37 to be opened. When the operator opens the hood 37 to remove the terminal strip 13 from the stripping apparatus the switch 38 is actuated resulting in the removal of power to the control circuit (not shown) which results in the de-energization of all solenoids in preparation for a subsequent stripping operation. The terminal strip 13 and the die halves 11 and 12 are removed then from the apparatus by the operator in preparation for a subsequent stripping operation.

It is to be understood that the above-described arrangements are simply illustrative of the application of the principles of the invention. Other arrangements may be devised by those skilled in the art which will embody the principles of the invention and fall within the spirit and scope thereof.

What is claimed is:

1. Mold stripping apparatus for removing molded articles from molds consisting in a unitary assembly of a pair of separable mold sections having apertures in the faces thereof, with a molded article formed in and positioned between the separable mold sections with rows of terminals extending from the molded article through the apertures in the separable mold sections, which comprises backing plates engaging the ends of the terminals extending through the apertures in the mold sections, means for holding the backing plates against the ends of the terminals during a portion of the mold stripping operation, means for moving said mold sections in opposite directions into engagement with said backing plates and for holding them in a spaced relationship with the faces thereof in a parallel relationship, furcated support means, means for reciprocating said support means into position to support the molded article with the furcations of the support means positioned between the rows of the terminals and on opposite sides of the molded article, and means for causing the backing plates to move in opposite directions away from the ends of the terminals to permit said mold-section moving means to cause further movement of the mold sections away from each other and thereby removal of the terminals extending from the article from the apertures in the mold sections and removal of the molded article from the separable sections of the mold.

2. Mold stripping apparatus for removing molded articles from molds consisting in a unitary assembly of a pair of separable mold sections having apertures in the faces thereof with a molded article formed in and positioned between the separable mold sections with rows of terminals extending from the molded article through the apertures in said separable mold sections into concavities on opposing sides of the separable mold sections, which comprises a base plate upon which the mold sections are supported for relative sliding movement, backing plates with a peripheral shape complementary to the concavities in the mold sections engaging the ends of the terminals extending through the apertures in the mold sections, means for holding the backing plates against the ends of the terminals during a portion of the mold stripping operation, means for sliding said mold sections in opposite directions on said base plate with the surfaces of the concavities in engagement with said backing plates and for holding them in a spaced relationship with the faces thereof in a parallel relationship, furcated support means, means for reciprocating said support means into position to support the molded article with the furcations of the support means positioned between the rows of the terminals and on opposite sides of the molded article, and means for causing the backing plates to move in opposite directions away from the ends of the terminals to permit said mold section sliding means to cause further movement of the mold sections away from each other and thereby removal of the terminals extending from the article from the apertures in the mold sections and removal of the molded article from the separable sections of the mold.

3. Mold stripping apparatus for removing molded articles from molds consisting in a unitary assembly of a pair of separable mold sections having apertures in the faces thereof with a molded article formed in and positioned between the separable mold sections with rows of terminals extending from the molded article through the apertures in the separable mold sections, which comprises a base plate upon which the mold sections are supported for relative sliding movement, backing plates engaging the ends of the terminals extending through the apertures in the mold sections, means for holding the backing plates against the ends of the terminals during a portion of the mold stripping operation, reciprocating cam means for sliding said mold sections in opposite directions on said base plate into engagement with said backing plates and for holding them in a spaced relationship with the faces thereof in a parallel relationship, furcated support means forming spaced parallel comb members, means for reciprocating said support means into position to support the molded article with the furcations forming the teeth of the combs of the support means positioned between the rows of the terminals and the combs on opposite sides of the molded article, and means for causing the backing plates to move in opposite directions away from the ends of the terminals to permit said cam means to cause further movement of the mold sections away from each other and thereby removal of the terminals extending from the article from the apertures in the mold sections and removal of the molded article from the separable sections of the mold.

4. Mold stripping apparatus for removing molded articles from molds consisting in a unitary assembly of a pair of separable mold sections having apertures in the faces thereof with a molded article formed in and positioned between the separable mold sections with rows of terminals of varying lengths extending from the molded article through the apertures in the separable mold sections, which comprises backing plates engaging the ends of the terminals extending through the apertures in the mold sections with the faces thereof complementary to the contour formed by the ends of the terminals contacted thereby, means for holding the backing plates against the ends of the terminals during a portion of the mold stripping operation, means for moving said mold sections in opposite directions into engagement with said backing plates and for holding them in a spaced relationship with the faces thereof in a parallel relationship, furcated support means, means for reciprocating said support means into position to support the molded article with the furcations of the support means positioned between the rows of the terminals and on opposite sides of the molded article, and means for causing the backing plates to move in opposite directions away from the ends of the terminals to permit said mold-section moving means to cause further movement of the mold sections away from each other and thereby removal of the terminals extending from the article from the apertures in the mold sections and removal of the molded article from the separable sections of the mold.

5. Mold stripping apparatus for removing molded articles from molds consisting in a unitary assembly of a pair of separable mold sections having apertures in the faces thereof with a molded article formed in and positioned between the separable mold sections with rows of terminals extending from the molded article through the apertures in the separable mold sections, which comprises a base plate upon which the mold sections are supported for relative sliding movement, backing plates engaging the ends of the terminals extending through the apertures in the mold sections, means for holding the backing plates against the ends of the terminals during a portion of the mold stripping operation, means for sliding said mold sections in opposite directions on said base plate into engagement with said backing plates and for holding them in a spaced relationship with the faces thereof in a parallel relationship, furcated support means, means for reciprocating said support means into position to support the molded article with the furcations of the support means positioned between the rows of the terminals and on opposite sides of the molded article, and means for causing the backing plates to move in opposite directions away from the ends of the terminals to permit said mold-section sliding means to cause further movement of the mold sections away from each other and thereby removal of the terminals extending from the article from the apertures in the mold sections and removal of the molded article from the separable sections of the mold.

References Cited in the file of this patent

UNITED STATES PATENTS

| | | |
|---|---|---|
| 2,339,434 | Stehlik | Jan. 18, 1944 |
| 2,421,058 | Eckstein | May 27, 1947 |
| 2,794,211 | Brown et al. | June 4, 1957 |